United States Patent [19]

Rao

[11] Patent Number: 5,359,671
[45] Date of Patent: Oct. 25, 1994

[54] CHARACTER-RECOGNITION SYSTEMS AND METHODS WITH MEANS TO MEASURE ENDPOINT FEATURES IN CHARACTER BIT-MAPS

[75] Inventor: Arun Rao, Pittsford, N.Y.

[73] Assignee: Eastman Kodak Company, Rochester, N.Y.

[21] Appl. No.: 860,933

[22] Filed: Mar. 31, 1992

[51] Int. Cl.$^5$ .................. G06K 9/62; G06K 9/48; G06K 9/68
[52] U.S. Cl. ........................ 382/15; 382/21; 382/38
[58] Field of Search .............. 382/22, 14, 15, 16, 382/21, 23, 30, 37, 38, 39

[56] References Cited

U.S. PATENT DOCUMENTS

| | | | |
|---|---|---|---|
| 4,542,526 | 9/1985 | Satoh et al. | 382/13 |
| 4,718,102 | 1/1988 | Crane et al. | 382/13 |
| 4,817,187 | 3/1989 | Lien | 382/56 |
| 4,906,940 | 3/1990 | Greene et al. | 382/16 |
| 4,972,499 | 11/1990 | Kurosawa | 382/38 |
| 5,034,989 | 7/1991 | Loh | 382/13 |
| 5,040,223 | 8/1991 | Kamiya et al. | 382/38 |
| 5,050,219 | 9/1991 | Maury | 382/3 |
| 5,133,023 | 7/1992 | Bokser | 382/40 |

OTHER PUBLICATIONS

J. J. Koenderink et al., "Two-dimensional curvature operators," *Journal of the Optical Society of America*, vol. 5, No. 7, Jul. 1988, pp. 1137–1141.

K. Prazdny, "Simulitude-Invariant Pattern Recognition Using Parallel Distributed Processing," *Proceedings of the Sixth National Conference on Artificial Intelligence*, Seattle, Wash., 1987, pp. 728–732.

*Proc. of the Int. Joint Conf. on Pattern Recognition, 8 Nov. 1976, Coronado, Calif., pp. 113–118; Y. Fujimoto et al., "Recognition of handprinted characters by nonlinear elastic matching".

*Pattern Recognition, vol. 24, No. 7, 1991, Elmsford, N.Y., US, pp. 617–632; S. W. Lu et al. "Hierarchical attributed graph representation nad recognition of handwritten Chinese characters".

*Proc. Computer Vision and Pattern Recognition, 5 Jun. 1988, Ann Arbor, Mich., pp. 424–429; J. Ohya et al., "A relaxational extracting method for character recognition in scene images".

*Primary Examiner*—David K. Moore
*Assistant Examiner*—Michael R. Cammarata
*Attorney, Agent, or Firm*—Dennis R. Arndt

[57] ABSTRACT

Character recognition method and system that identifies an input character as being a unique member of a defined character set. Specifically, a character bit-map of an input character is first generated. Thereafter, a character recognition procedure processes the character bit-map to generate a set of confidence measures one for each of the members of the character set. The confidence measures represent the degree of confidence that the input character corresponds to the members of the character set. A test is then made to determine if the confidence measure with the highest degree of confidence is acceptable. If there is an acceptable confidence measure, the member of the character set with the acceptable confidence measure is reported as the output character. If there is no acceptable confidence measure, a number of characters with the highest confidence measures are identified as candidates. Also, the character bit-map is analyzed further to obtain stroke-endpoint information which is then compared to a learned endpoint database having a number of character string-signature pairs. If there is a match between a database string and a candidate character, the match is used to report an output character. Endpoint location and orientation are obtained by modeling the bit-map as a charge distribution. A potential profile is constructed and thresholded and the results clustered into regions to obtain endpoint location information- The gradient of the potential profile is used to obtain endpoint orientation information.

22 Claims, 5 Drawing Sheets (010 000 000 000 000 000 000 000 100 000 000 011)
36-BIT BINARY SIGNATURE

CHARACTER-RECOGNITION SYSTEMS AND METHODS WITH MEANS TO MEASURE ENDPOINT FEATURES IN CHARACTER BIT-MAPS

TECHNICAL FIELD OF THE INVENTION

This invention relates to character recognition techniques and, more particularly, to systems and methods for efficiently improving a margin of error in a machine recognition of printed characters.

BACKGROUND ART

Computer techniques for machine recognition of hand printed characters have advanced considerably in the recent past. As a margin between error rates of a particular character recognition procedure and those of humans continues to decrease, further reductions in the error rate have become progressively more difficult to attain. In the case of neural-network-based algorithms, for example, this difficulty translates to procuring ever larger sets of training data for progressively smaller gains in error rates.

In view of this phenomena, one technique for reducing this error rate for machine based recognition processes has been to simultaneously use multiple recognition procedures, that have uncorrelated errors (i.e. make different kinds of mistakes), so that overall performance is enhanced. This technique exacts a fairly severe computational penalty, since the different procedures often have completely different (and hence non-shareable) intermediate steps, all of which have to be performed for each character.

A more efficient technique has been to simultaneously use only one or a few independent procedures for most characters and use additional independent procedures only for characters having a low measure of confidence. Although this technique can improve recognition error rates, the associated computational penalty can still be considerable. Unfortunately, this technique can be used effectively only with procedures that can provide a reasonably accurate measure of confidence.

More specifically, conventional optical character recognition (OCR) systems generally have as many outputs as there are characters to be recognized. An input character is usually identified by examining the values of the outputs. One of the simplest methods is to choose a character for the input character being recognized as that which corresponds to a particular output that has a maximum (or minimum) value. The confidence measure is also a function of the output values. In its most basic form, the value of the maximum (or minimum) output may be a measure of the confidence. A slightly more sophisticated confidence measure can be determined as a ratio between the maximum and a next highest output. However, the accuracy of confidence measure varies widely between the methods of measurement and between different OCR procedures.

Thus, a need still exists in the art for increasingly efficient techniques of reducing the margin between the error rates of particular OCR procedures and those of humans.

SUMMARY

It is, therefore, an object of my present invention to provide techniques for efficiently reducing the error rates of character recognition systems and methods.

Another object is to improve the performance of feature-based character recognition systems by measuring additional character-features only when the "best" confidence measure is low.

Still another object of the invention is to provide systems and methods that quickly and efficiently obtain stroke-endpoint location and orientation from a character bit-map.

These and other objects are achieved in accordance with my inventive teachings by: effectively constructing a simple signature from each input character to be recognized based on quickly computable features only in those cases in which the confidence measure generated by an optical character recognition (OCR) procedure is low and then to use this signature to make an improved choice for that character. The key to the success of my inventive approach, when used in conjunction with an OCR procedure, lies in the quality of the signature and the accuracy of the confidence measure of this procedure.

In particular, it is widely recognized that curvature discontinuities in objects are strong contributors to human perception. By extending this concept to handwritten characters, I have found that the location and orientation of stroke endpoints prove to be very valuable features for character identification. As such, my invention relies on incorporating this information into the recognition process.

More specifically, my invention employs a character-feature measuring technique that is based on a charge model for pixels. Character endpoints are located by computing a "potential" at each pixel and applying a threshold. A binary signature is constructed from this information. A database of signatures and associated characters is then constructed using a large training set of character bit-maps. During actual use, a low confidence measure from the OCR procedure triggers a signature generation process. The signature is used to retrieve a list of potential characters from a previously created database. The character list is used to decide between first and second choices generated by the OCR procedure.

Specifically, in a training phase, known bit-mapped characters are presented to an endpoint-locating procedure. Endpoint location and orientation information are found and processed to yield a binary string (string of 1's and 0's) which constitutes the signature for each character. A database is built in which each entry consists of a signature and an associated string of likely candidate characters.

One aspect of my invention is directed to character recognition systems and methods that identify an input character as being a unique member of a defined character set. In particular, a character input device generates a character bit-map of an input character. A character recognition procedure processes the character bit-map and generates a set of confidence measures: one for each of the members of the character set. The confidence measures represent the degree of confidence that the input character corresponds to the members of the character set. The confidence measures are tested to decide if the confidence measure with the highest degree of confidence is an acceptable confidence measure. A first output device reports the member of the character set with the acceptable confidence measure as an output character. If there is no acceptable confidence measure, an augmenter identifies (N) of the members with the (N) highest confidence measures as candidates and further processes the bit-map. The augmenter measures a character feature of the bit-map. A second output device reports one of the (N) members as an output character based on the measure of the character feature.

According to another aspect of my invention, the character bit-map is analyzed by the augmenter to obtain stroke-endpoint information which is compared to a learned endpoint database having a number of character string-signature pairs. If there is a match between a database string and a candidate character, the match is used to report an output character. Endpoint location and orientation are obtained by modeling the bit-map as a charge distribution. A potential profile is constructed and thresholded and the results clustered into regions to obtain the endpoint location. The gradient of the potential profile is used to obtain the endpoint orientation.

BRIEF DESCRIPTION OF THE DRAWINGS

The teachings of the present invention may be readily understood by considering the following detailed description in conjunction with the accompanying drawings, in which.

To facilitate understanding, identical reference numerals, where possible, identify identical elements that are common to various figures.

MODES OF CARRYING OUT THE INVENTION

Figure 1:
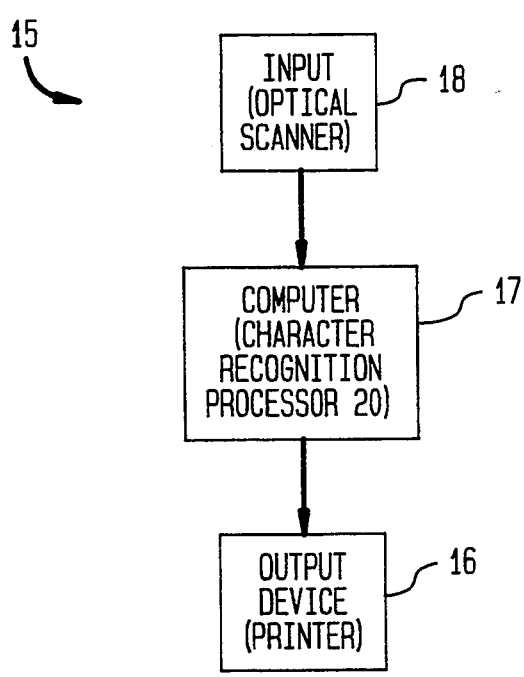
FIG. 1 is a block diagram of a preferred embodiment of an OCR system constructed in accordance with my inventive teachings.

Referring now to the drawings, FIG. 1 shows optical character recognition (OCR) system 15 having character input system 18, which may be a conventional optical scanning system, a digitizer/pen system, or other character input device. Input system 18 is connected to digital computer 17. Character recognition processor 20, constructed in accordance with my invention, is resident in computer 17. Appropriate output device 16 is connected to the output of computer 17. Output device 16 may be a printer, a disk storage, a display, a data transmitter, or similar device for presenting, storing or transmitting characters outputted by processor 20.

In general, the operation of OCR system 15 is as follows. This system first reads characters in a conventional manner via input system 18. The input characters may typically be gray-scale images of machine-printed or handwritten alphanumeric text. The input to computer 17 is typically a binary string that is obtained by thresholding gray-scale image data produced in input system 18. Processor 20 stores the binary string as a set of bit-maps, one for each of the scanned characters. This processor then processes the bit-maps to select an output character from an internally stored database of characters. The selected output character is then transmitted to output device 16.

Figure 2:
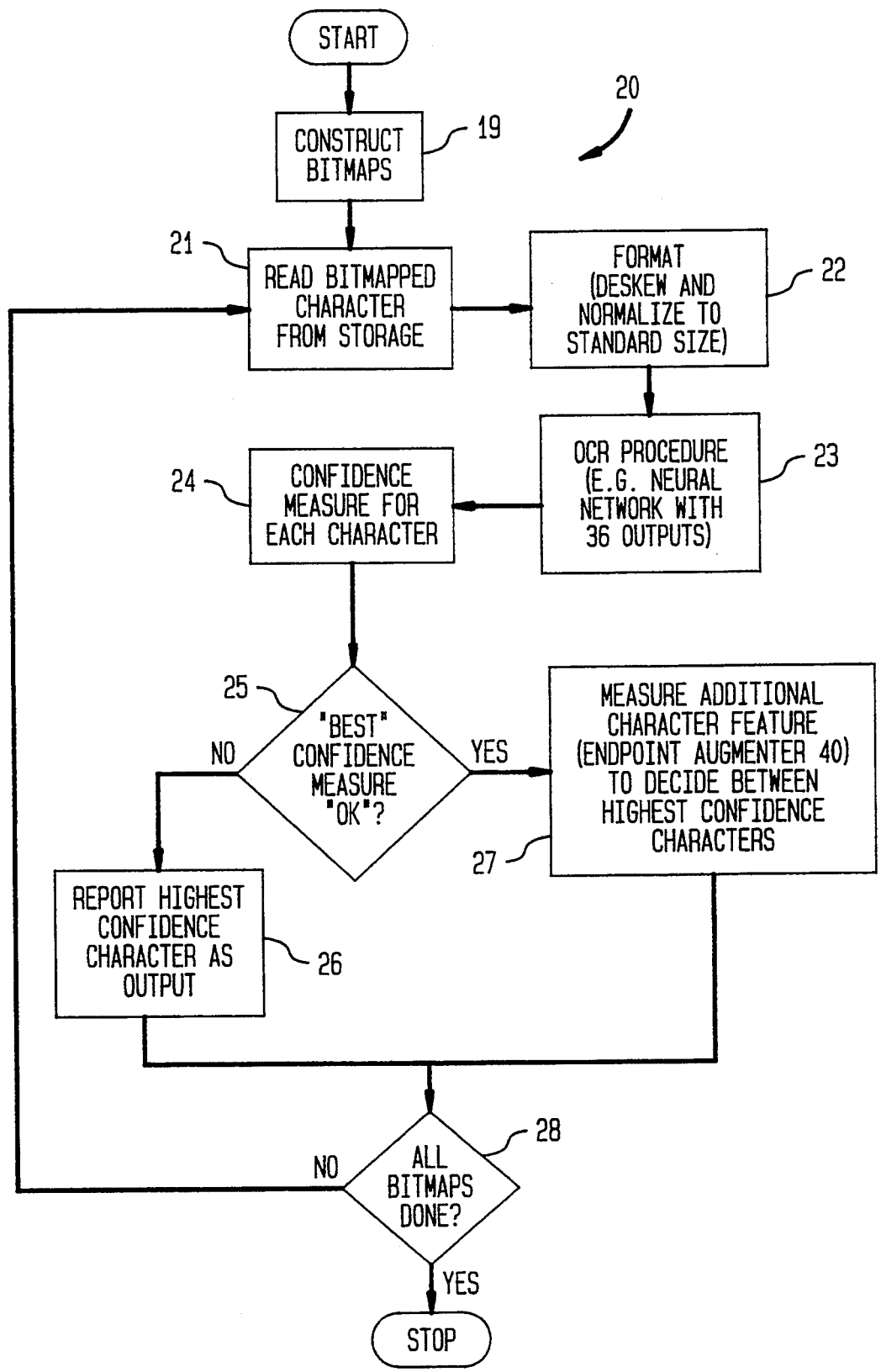
FIG. 2 is a flow diagram for the OCR system of FIG. 1.

In FIG. 2, processor 20, typically being implemented through software, is shown in the form of a detailed flow diagram. In construct-bit-maps step 19, processor 20 constructs bit-maps from the binary string inputted by system 18 (see FIG. 1). The bit-maps are stored in an appropriate storage location (e.g. a disk file) of computer 17.

Figure 3:
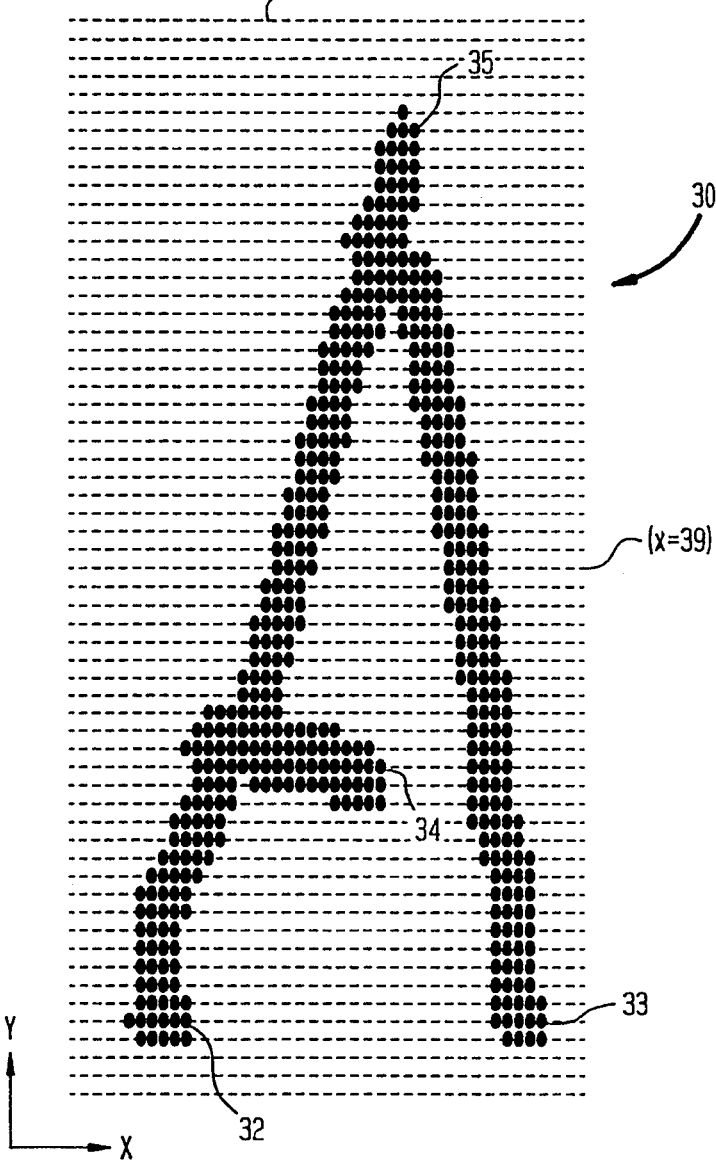
FIG. 3 is a diagrammatic view of a two-dimensional character bit-map.

FIG. 3 diagrammatically shows a bit-map 30 of the type that would be obtained as a result of scanning a printed or handwritten character "A" at a large number of pixel locations. Bit-map 30 is represented here as a rectangular array of pixel locations arranged in columns x and rows y, with each of the pixel locations occupied by either a black or white pixel. The pixels are shown in FIG. 3 as an array of dots and dashes.

More specifically, for the illustrative example shown in FIG. 3, bit-map 30 consists of a total of thirty-nine columns and sixty rows. As such, bit-map 30 has 2,340 pixel locations. White pixels are represented by dashes (unoccupied pixel locations); while black pixels are represented by dots (occupied pixel locations) that together form the character "A" in uppercase. The character "A" in bit-map 30 has a number of character features including stroke endpoints 32–35. Of course, character bit-map 30 may be stored in computer 17 as a binary string of 2,340 bits (string of "1's" and "0's").

As shown in FIG. 2, after constructing and storing the bit-maps, processor 20 retrieves a bit-mapped character from its storage location in read step 21. In format step 22, the retrieved bit-map data is prepared for processing by performing such conventional functions as de-skewing and normalizing the bit-map to a standard size. Processor 20 then processes the bit-map data in OCR step 23 in accordance with an OCR procedure. For purposes of this description, the OCR procedure is assumed to be a conventional neural network having 2,340 inputs corresponding to the 2,340 pixels of bit-map 30 and, for example, thirty-six outputs corresponding to the total number of possible characters to be read, i.e. twenty-six uppercase letters of the alphabet plus ten numeric digits from zero to nine.

In confidence-measure step 24, the thirty-six outputs generated by the OCR procedure in OCR step 23 are used to obtain a confidence measure for each of the possible thirty-six characters. As mentioned above, many conventional OCR systems use these thirty-six outputs themselves as the confidence measures. For example, upon processing a bit-map in OCR step 23, the OCR procedure assigns a number, typically between zero and one, to each of the possible thirty-six characters. The values of these assigned numbers usually indicate the degree to which the processed bit-map corresponds to each of the various characters based on the criteria used by the OCR procedure. As such, these thirty-six assigned numbers may be directly used as confidence measures. Other OCR procedures often generate more accurate confidence measures. For instance, confidence measures may also be generated by computing a complex function of the set of thirty-six assigned numbers. Ascertaining a reasonably accurate confidence measure assures that an improvement in the accuracy of the final choice of an output character is efficiently accomplished.

More specifically, at least one of the assigned numbers from OCR step 23 will have, in most situations, a relatively high value. As such, its corresponding character will normally be selected as the output character, especially if the assigned number is much greater than the next highest assigned number, i.e. the ratio of the two highest assigned numbers is not close to one. In other situations, however, it may happen that all of the thirty-six assigned numbers are very low, or two or more assigned numbers, though high, are very close in value such that their ratios are very close to one. In these cases, the choice of an output character will not be clear. In fact, here, the character with the highest assigned number may not be the correct choice. In these questionable instances, the accuracy of the final selection is improved through use of the present invention by processing the bit-map further to choose between a few of the best candidates identified in OCR step 23.

In decision step 25, processor 20 decides if the "best" confidence measure is acceptable, i.e. is "OK", according to a pre-determined criteria as described above. If the "best" confidence measure is acceptable, the character with the "best" confidence measure is reported as the output character in output step 26. On the other hand, if the "best" confidence measure is not "OK", then two or more of the characters with, for example, the highest assigned numbers are identified as candidates and the bit-map is processed further in augment step 27 using different criteria (e.g. endpoint location and orientation) to select the proper output character for the character currently being recognized. After an output character is chosen in either output step 26 or augment step 27, the process steps are repeated, via decision step 28, until all bit-maps have been processed.

As indicated above, many OCR procedures do not directly make use of stroke-endpoint information and often incorrectly identify characters which are distinguishable on the basis of these features alone. I have found that the location and orientation of stroke endpoints for most handwritten characters prove to be very valuable features for character identification.

Figure 4:
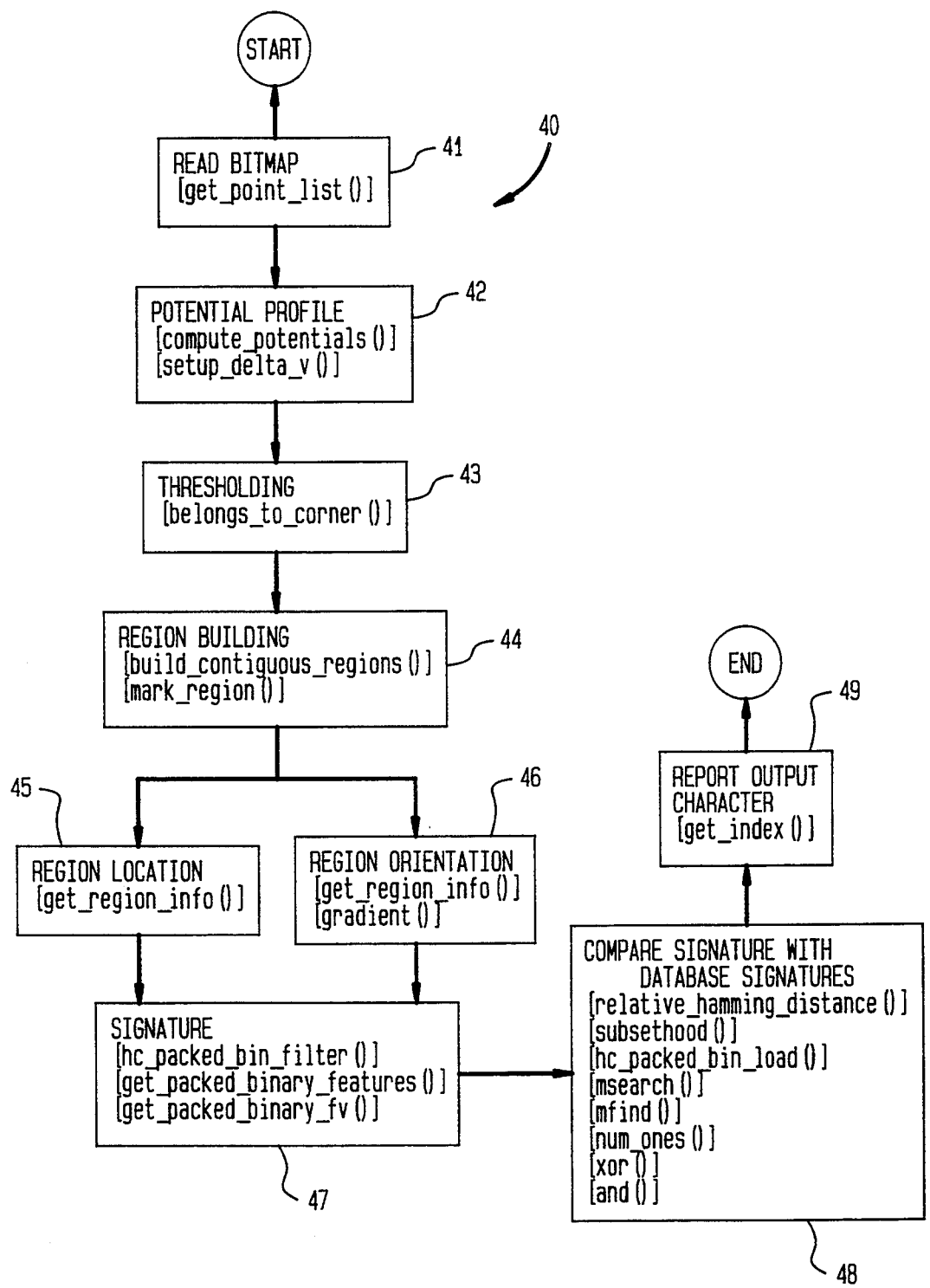
FIG. 4 is a computer flow diagram illustrating in detail the endpoint-augmenter portion of the flow diagram of FIG. 2.

FIG. 4 shows a flow diagram for endpoint augmenter 40 that is used in augment step 27 shown in FIG. 2. A specific implementation of the endpoint augmenter 40 appears in APPENDIX A which lists a computer program written in the computer language "C" for a Sun SPARCstation running the UNIX operating system ("SPARCstation" is a registered trademark of Sun Microsystems, Inc. and "UNIX" is a registered trademark of American Telephone and Telegraph Company). This description and FIG. 4 refer to sections of the APPENDIX A program via their program labels that are enclosed in square brackets.

Endpoint augmenter 40 is a feature-based procedure in which the location and orientation of the stroke-endpoints of a character bit-map are measured, e.g. see endpoints 32–35 in FIG. 3. When triggered by decision step 25 (see FIG. 2), endpoint augmenter 40, in read step 41 shown in FIG. 4, begins by reading the bit-map constructed in construct-bit-maps step 19 (again see FIG. 2). Read step 41 is performed in program section [get_point_list()] (see APPENDIX A).

Endpoint augmenter 40 then analyzes the bit-map for stroke-endpoint locations and orientations. To perform this function, endpoint augmenter 40 first treats the bit-map as a point distribution function and then finds its potential profile V(x,y), where x and y are the rectangular coordinates of the pixel locations in the bit-map. These functions are performed in potential-profile step 42 (see FIG. 4) which corresponds to program sections [setup_delta_v()] and [compute_potentials()] (see APPENDIX A).

More specifically, the set of black pixels (dots) in character bit-map 30 (see FIG. 3) constitute a point distribution function that is related to a potential function V(x,y) by a Poisson differential equation. To simplify and facilitate the process, each black pixel (dot) of bit-map 30 is modeled as an electrostatic charge (e.g. a negative charge); the entire bit-map 30 is modeled as a charge distribution on a dielectric surface. Using this model, the potential function V(x,y) corresponds to the electric potential (volts) produced by the charge distribution. A potential profile of the electrostatic potential V for bit-map 30 is computed using a Poisson differential equation as set forth in equation (1) below:

$$\frac{\partial^2 V}{\partial x^2} + \frac{\partial^2 V}{\partial y^2} = -\frac{\rho}{\epsilon} \quad (1)$$

where:

V = V(x,y) (potential profile), $\rho$ is charge density at any point, and $\epsilon$ is the dielectric constant.

Since actual electrostatic charges are not involved, several simplifying assumptions are made for the model. First, the right-hand side of Equation (1) is replaced by a constant at black pixel locations and zero elsewhere (white pixels). Also, since an accurate solution for potential V(x,y) is not required, it is assumed that each charge (black pixels) influences only a small neighborhood around it. These assumptions significantly accelerate the process of obtaining the potential profile V(x,y) when using this charge-based model.

Figure 5:
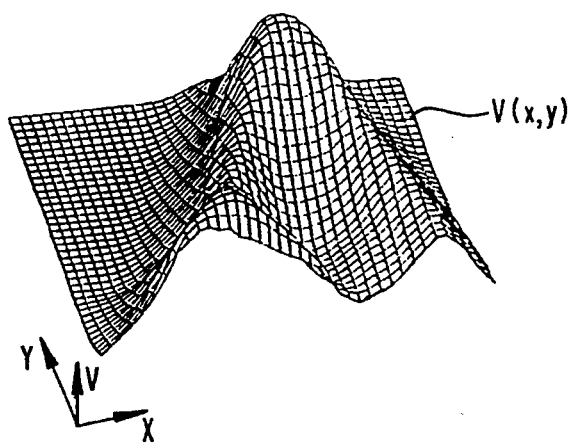
FIG. 5 is a three-dimensional graph illustrating a computed potential profile for a character bit-map of the type shown in FIG. 3.
Figure 6:
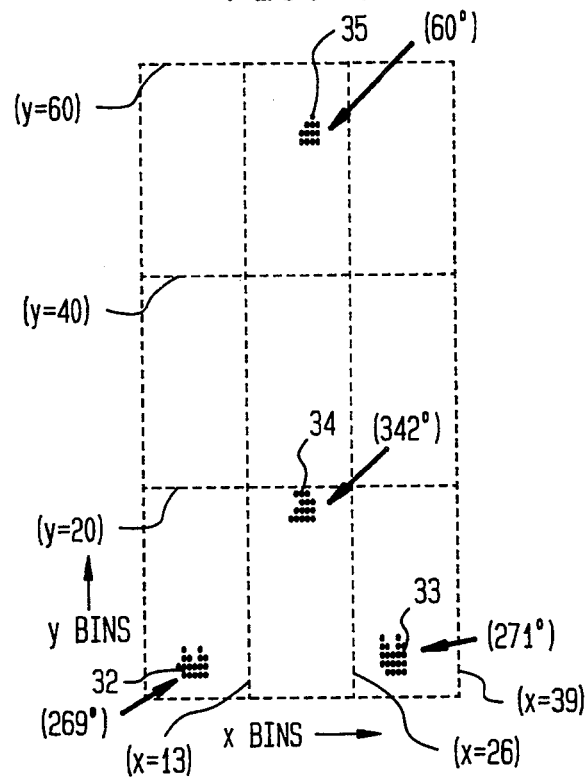
FIG. 6 is a diagrammatic view, similar to the view of FIG. 3, showing those regions of the character bit-map of FIG. 3 that have been identified as stroke endpoints.

FIG. 5 graphically shows a typical potential profile V(x,y) that would be computed in potential-profile step 42 shown in FIG. 4. From FIG. 5, it is evident that those black pixels located towards the edges will have relatively low potentials V. Moreover, those edge-pixels that are also located at the extremities of the characters (e.g. at stroke endpoints 32–35) will have the lowest potentials V, and can be isolated from the bit-map by thresholding, a process that is performed in thresholding step 43 (see FIG. 4) and in program section [belongs_to_corner()]. FIG. 6 shows the thresholded pixels for the bit-map 30 of FIG. 3.

Since there are typically multiple endpoints, such as the four endpoints 32–35, and since each endpoint will include a number of pixels (see FIG. 6), it is not sufficient just to perform thresholding step 43 in endpoint augmenter 40 shown in FIG. 4; contiguous regions of thresholded pixels must be clustered together and cluster regions located. Cluster regions are located in region-building step 44 and program sections [build_contiguous_regions()] and [belongs_to_corner()]. The region-building function is performed by making a search of the x-y locations of the thresholded pixels to locate those pixels that are located adjacent to each other. The adjacent pixels are then grouped into regions. Four regions are illustratively shown in FIG. 6.

The locations of the regions are now determined in region-location step 45, shown in FIG. 4, which is performed in program section [get_region_info ( )]. The region locations are determined by finding their average column-row coordinates $x_i$ and $Y_i$ as follows. If there are n regions, and $k_i$ points in the $i^{th}$ region, then using equations (2) and (3) below:

$$x_i = \frac{\sum_{j=1}^{k_i} x^j}{k_i} \quad (2)$$

$$y_i = \frac{\sum_{j=1}^{k_i} y^j}{k_i} \quad (3)$$

where: $(x_i, Y_i)$ is the pixel location of the $i^{th}$ region.

The region orientations are next determined in region-orientation step 46 which corresponds to program sections [get_region_info()] and [gradient()]. Region orientations are determined by first finding the gradient F of the potential V, i.e. $F(x,y) = \text{grad } V(x,y)$. Using the electrostatic charge model, F corresponds to the electric field at a point (x,y). Using the x-y components of F, the region orientations are given by equation (4) as follows:

$$\theta_i = \tan^{-1} \left[ \frac{\sum_{j=1}^{k_i} F_j^y}{\sum_{j=1}^{k_i} F_j^x} \right] \quad (4)$$

where:

$F_j^x$ and $F_j^y$ are the x and y components, respectively, of the gradient, and $\theta$ is the angle measured counterclockwise from the x axis.

FIG. 6 graphically shows the spatial locations of the regions generated for the endpoints 32–35 of the hand printed letter "A" of FIG. 2, and the angles $\theta_i$ at which the endpoints 32–35 are oriented. Specifically and illustratively, endpoint 32 is directed downwardly at 269°. Endpoint 33, which is almost parallel to endpoint 32, is directed at 271°. Endpoint 35 is directed at 60° and endpoint 34 is directed at 342°.

A binary signature of the endpoint locations and orientations for the bit-map being processed is now computed in signature step 47, shown in FIG. 4, which corresponds to program sections [hc_packed_bin_filter()], [get_packed_binary_features ()] and [get_packed_binary_fv()]. The binary signature is constructed by dividing the spatial and orientation dimensions into a number of bins defined herein as x-bins, y-bins and $\theta$-bins. (See the defined constants XBINS, YBINS and THETA_BINS in the APPENDIX A program.) As seen in FIG. 6, the area of bit-map 30 is divided into nine areas corresponding to the x- and y-bins. The boundaries of the x- and y-bins are located at x=1, 13, 26, 39 and y=1, 20, 40, 60.

Figure 7:
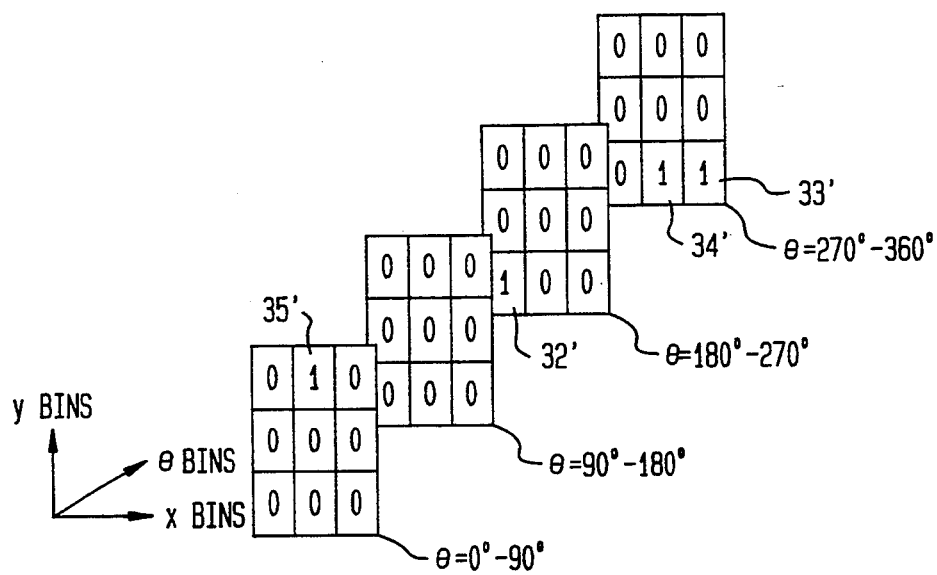
FIG. 7 is a three-dimensional diagram illustrating spatial and orientation bins useful in understanding the invention.

Each of the x-, y- and $\theta$-bins represents a particular combination of endpoint location and orientation. FIG. 7 illustrates a situation in which there are three x-bins, three y-bins and four $\theta$-bins. A bin is assigned a value of unity if at least one region falls within it, and zero otherwise. Based on this rule, bin 35' of FIG. 7 is assigned a one because: (1) the corresponding x- and y-bins in FIG. 6 include endpoint 35, and (2) endpoint 35 has a 60° orientation. Likewise, bins 32', 33' and 34' are all assigned ones because they correspond to the locations and orientations of endpoints 32, 33 and 34, respectively. Each of the other bins are assigned a zero because no other endpoints have been located. Finally, these ones and zeros are folded out in a pre-specified order to construct the binary signature vector as illustrated in FIG. 7.

The signature vector is then compared, in compare step 48, shown in FIG. 4, to a stored database of signature vectors and their associated character strings to locate any character matches between the members of the character strings and the identified candidate characters with the "best" confidence measures. If there is only one match, the matching candidate character is reported as the output character in output step 49. If there are a number of matching candidate characters, the matching character with the highest confidence measure is reported as the output character in output step 49. If there are no character matches, the candidate character with the highest confidence measure is reported as the output character in output step 49.

The signature database is generated during a training phase. This database is stored as an array of structures in computer 17. In this regard, processor 20 is trained with a training set, i.e. a large number of known character bit-maps. Processor 20 presents the training set of known bit-maps to endpoint augmenter 40 for processing. After each signature vector is constructed in signature step 47, this vector and the associated character are stored in the signature database. The signature database consists of a list of signature-string pairs. Also included is a count of the number of times each signature was encountered while processing the training set. In each signature-string pair, the string contains all of the characters in the training set that generated the corresponding signature.

TABLE A below lists a section of a database that was created using a large training set (approximately 10,000 characters) collected from various sources (digitizer, scanner and others). For simplicity, this database section shows a 9-element (3×3×1) binary signature. Location information is not present in the signatures. The first entry in TABLE A shows that the training set contained bit-maps of the characters 0, 2, 4, C and G that generated the same signature twenty-one times. The second entry shows that a set of characters that included all elements of the character set (thirty-six characters) failed to produce an endpoint 2,384 times. In this regard, the absence of an endpoint could be the result of a number of reasons, such as the character often does not have an endpoint (e.g. "0") or the endpoint stroke was not of sufficient size to produce a reading.

TABLE A

| TRAINED DATABASE | | |
| --- | --- | --- |
| Character String | Occurrences | Signature |
| 024CG | 21 | 010001000 |
| 0123456789ABCDEFGHIJKLMNOPQRSTUVWXYZ | 2384 | 000000000 |
| 02345678BDFGHJKLMNOPRTUVWXYZ | 405 | 100000000 |
| 01569PGUKMNSTWXY | 461 | 001000100 |

TABLE A-continued
TRAINED DATABASE

| Character String | Occurrences | Signature |
|---|---|---|
| 0145689CEFGIJKMNPRSXY | 416 | 001000000 |
| 02359ABDEFGIJKMNPRSXY | 560 | 000000100 |
| 0124568ABCDEFGHIJKLMNOPQRSUWXY | 559 | 010000000 |
| 048HJKMNUWY | 36 | 011000000 |
| 0CEFGX | 45 | 001001000 |
| 146HIJKSY | 72 | 010000010 |
| 145789ABCDFGJLPQSTUVY | 181 | 000000010 |
| 1KTW | 58 | 001100010 |
| 17AIMX | 8 | 000100101 |
| 12ABIKMRX | 320 | 000000101 |
| 137BDJKPTY | 107 | 100000010 |
| 13567ABDHIJKMNPSXY | 123 | 010000100 |
| 127EHKLMRUXZ | 290 | 100000001 |
| 12ACEGHKLMQUZ | 141 | 010000001 |
| 2ABDEFTX | 12 | 000000110 |
| 2EGMQR | 13 | 000000011 |
| 2ABCEFGLZ | 53 | 000001000 |
| 2EHLUZ | 122 | 100001000 |
| 2M | 7 | 100000111 |
| 2Z | 18 | 100001001 |
| 279ACDEGHKLMNQRTUZ | 32 | 000100000 |
| 267EGZ | 13 | 000101000 |
| 27AQRTUZ | 20 | 000100001 |
| 2EM | 6 | 000010101 |
| 2HIKMRXYZ | 69 | 100000101 |
| 23567BDEFHIJKMPRXYZ | 223 | 100000100 |

A number of sections of the APPENDIX A program correspond to compare step 48 shown in FIG. 4. Program section [hc_packed_bin_load()] loads the database from file. Sections [msearch()] and [mfind()] are used to look up a signature by performing a metric search in the database and then return a list of elements meeting the specified matching criterion. In this case, a relative Hamming distance metric is used (see program sections [subsethood()], [relative_hamming_distance()], [num_ones()], [xor()], and [and()]). Output step 49 corresponds to program step [get_index()].

A polynomial-based OCR procedure was used to test the performance of processor 20 on 3600 character bit-maps generated by a GTC digitizer/pen mounted on a DECstation 3100 type workstation ("DECstation" is a trademark of Digital Equipment Corporation which also manufactures the workstation). The polynomial algorithm achieved 92.42% accuracy when used stand-alone without the endpoint augmenter 40. In conjunction with the endpoint augmenter 40, the accuracy improved to 94.14%, an error reduction of 22.7%.

Obviously many modifications and variations of the present invention are possible in the light of the above teachings. It is therefore to be understood, that within the scope of the appended claims, the invention may be practiced otherwise than as specifically described.

INDUSTRIAL APPLICABILITY AND ADVANTAGES

The present invention is useful in conjunction with optical character recognition (OCR) systems. In particular, when used in conjunction with such a system, the invention advantageously increases the recognition accuracy of characters than that previously obtainable in the art.

APPENDIX A

This appendix consists of a computer program listing that is written in the computer language "C" for a Sun SPARCstation running the UNIX operating system ("SPARCstation" is a registered trademark of Sun Microsystems, Inc. and "UNIX" is a registered trademark of American Telephone and Telegraph Company).

The program listing is an implementation of endpoint segmenter 40.

```
typedef struct {
            char       label_string[100];
            int        n_occur;
            char       *feature;
        } Category;
#define sqr(x) x*x
#define CONSTANT 0.05
#define DECAY 0.69
#define DEPTH 7
#define THRESHOLD 0.45
#define NEIGHBORHOOD 7
```

```
#define RAD_2_DEG (180.0/3.1415927)
#define MAX_REGIONS 10
#define MAX_POINTS 1000
#define MARK 99.99
#define NOISE_FLOOR 8
#define TOLERANCE 2
typedef struct
        {
                int     x;
                int     y;
        } Point;

typedef struct
        {
                double   x_off;
                double   y_off;
                double   delta_v;
        } Neighbor;

typedef struct {
                double   x;  /* x component of vector */
                double   y;  /* y component of vector */
        } Vector;

typedef struct {
                int   n_points;
                int   point_list[MAX_POINTS];
        } Region;

typedef struct {
                double          *array;
                double          threshold;
                Vector          *field;
                unsigned char   *bitmap;
                int             w;
                int             h;
        } Threshold_Data;

#include "config.h"
include "structures.h"

int
belongs_to_corner(index, data)

Threshold_Data  *data;
int             index;
```

```
{
    return(((data->array)[index] <= data->threshold)
        && (data->bitmap)[index]);
} define in_array(x,y,w,h) ((x < w) && (x >= 0) && (y < h) && (y >= 0))
int
is_edge(index, data)

Threshold_Data*data;
int         index;

{
    int   x, y, xi, yi, index1, i;
    static int    offset_x[] = {0, 0, 1, -1,-1, 1, 1, -1},
                  offset_y[] = {1, -1, 0, 0, 1, 1, -1, -1};

x = index%(data->w);
    y = (int)(index/(data->w));

for(i = 0; i < 8; i++)
    {
        xi = x + offset_x[i];
        yi = y + offset_y[i];
        index1 = yi * data->w + xi;
        if(in_array(xi, yi, data->w, data->h))
        {
            if(!(data->bitmap)[index1])
                return(1);
        }
        else
                return(1);
    } return(0);
}
/* Builds list of contiguous regions based upon a specified membership
   function */ include "config.h"
include "structures.h"

#define getrandom( min, max ) T
((lrand48() % (int)(((max)+1) - (min))) + (min))
```

```
void
build_contiguous_regions(a, w, h, ismember, call_data, regions, n)

double   a[];   /* (2D) array from which regions must be constructed */
int    w, h;  /* Dimensions of 2D array */
int    (*ismember)();  /* Function to determine membership */
char   *call_data;  /* Pointer to data to be passed to function */
Region *regions;  /* List of regions found */
int    *n;  /* Number of regions found */

{
        int   i, j, row_offset;
        void  mark_region();

(*n) = 0;
        row_offset = 0;
        for(i = 0; i < h; i++)
        {
                for(j = 0; j < w; j++)
                {
                        if(a[row_offset + j] != MARK)
                            if(ismember(row_offset + j, call_data))
                            {
                                    regions[(*n)].n_points = 1;
                                    a[row_offset + j] = MARK;
                                    (regions[(*n)].point_list)[0] = row_offset + j;
                                    mark_region(j, i, a, w, h, ismember,
                                        call_data, &regions[(*n)]);
                                    if(regions[*n].n_points > NOISE_FLOOR)
                                        (*n)++;
                            }
                }
                row_offset += w;
        }

} define in_array(x, y, w, h) T
((x < w) && (x >= 0) && (y < h) && (y >= 0))

void
mark_region(x, y, a, w, h, ismember, call_data, region)

int   x, y, w, h;
```

```
int    (*ismember)();
char   *call_data;
Region *region;
double *a;

{
    int    x_offset, y_offset, index, dummy, index1;
    static int offset_x[] = {0, 0, 1, -1,-1, 1, 1, -1},
               offset_y[] = {1, -1, 0, 0, 1, 1, -1, -1};

static int prev_index = -1, count, run_length = 0;
    int    index_list[8];
    int    i;

for(i = 0; i < 8; i++)
          index_list[i] = -1;

count = 0;
    index = -2;
    for(i = 0; i < 8; i++)
    {
              x_offset = offset_x[i];
              y_offset = offset_y[i];
              if(in_array(x + x_offset, y + y_offset,
                    w, h))
              {
                    if(a[
                 (index1 = (y+y_offset)*w + (x + x_offset))
                           ] != MARK)
                           if(ismember(index1, call_data))
                           {
                                  count++;
                                  index = i;
                                  index_list[i] = index1;
                           }
              }
    } if((count <= 1) && (index == prev_index))
          run_length++;
    else
          run_length = 0;

/* Prevent single direction runs */
    if((count > 1) | (index != prev_index))
    /*if(run_length < 3)*/
```

```
            for(i = 0; i < 8; i++)
            {
                if((index_list[i] != -1) && (a[index_list[i]] != MARK))
                {
                    a[index_list[i]] = MARK;
                    (region->point_list)[(region->n_points)++]
                                    = index_list[i];
                    prev_index = i;
                    mark_region(x+offset_x[i], y+offset_y[i],
                        a, w, h, ismember, call_data, region);
                }
            }
```

}
/*
Author:   Arun Rao
          1/9/EP/35722
          Eastman Kodak Company
          Rochester, NY 14653-5722

History:
          Started ..... October 3, 1991.

Description:

*/ include <stdio.h>
include <math.h>
include <string.h>
include <search.h> include "binstruct.h"

define THRESHOLD 0.65
define DEPTH 8
define REJECT_TOL 0.5
define MAX_LABELS 200 void
hc_packed_bin_filter
        (bitmap, w, h, mask, threshold, reject_tolerance, display_tty)

unsigned char   bitmap[];
int             w, h;
int             **mask;
double          threshold;
int             reject_tolerance;

```
char        *display_tty;

{
    int         i, j, k, nf;
    Category    *location, **list, **list_ptr;
    int         index, found;
    Category    key;
    int         fv_el;

/* Static declarations */
    static char         *order =
                "0123456789ABCDEFGHIJKLMNOPQRSTUVWXYZ";
    static   char       absent_chars[62];
    static Category     *cat_array = NULL;
    static int          char_mask[62], nel;
    static int          n_absent = 0;

/* Functions */
    char        *get_packed_binary_features();
    int         int_compare();
    Category    **mfind();
    double              relative_hamming_distance(),
                        subsethood();

if(cat_array == NULL)
    {
        /*fprintf(stderr, "Loading categories ...0);*/
        hc_packed_bin_load(&cat_array, &nel);
        n_absent = 0;
        for(i = 0; i < 62; i++)
        {
            found = 0;
            for(j = 0; j < nel; j++)
                if(strchr(cat_array[j].label_string, order[i]))
                {
                    found = 1;
                    j = nel;
                }
            if(!found)
                absent_chars[n_absent++] = i;
        }

} key.feature = get_packed_binary_features(bitmap, w, h,
```

```
                    threshold, &nf, &fv_el, display_tty);
    if((list = (Category **)mfind((char *)&key,
            (char *)cat_array, &nel, sizeof(key),
            subsethood, 0.25)) && key.feature)
    {
        for(i = 0; i < 62; i++)
            char_mask[i] = 0;
        list_ptr = list;
        while(*list_ptr)
        {
            for(i = 0; i < strlen((*list_ptr)->label_string); i++)
            {
              index = get_index(((*list_ptr)->label_string)[i]);
              char_mask[index] = 1;
            } list_ptr++;
        }
        /*for(i = 0; i < 62; i++)
        {
          if(char_mask[i])
              printf("%1c", order[i]);
        }
        printf("0);
        */ for(i = 0; i < n_absent; i++)
                char_mask[absent_chars[i]] = 1;

while(!free(list));
    }
    else
        for(i = 0; i < 62; i++)
            char_mask[i] = 1;

*mask = char_mask;
} static double
relative_hamming_distance(n1, n2)

Category  *n1, *n2;

{ double   h;
    char *xor();
```

```
    int    num_ones();

h = (double)num_ones(xor(n1->feature, n2->feature))
                /(double)num_ones(n1->feature);

return(h);
} static double
subsethood(n1, n2)

Category  *n1, *n2;

{
    double    h;
    char   *and();
    int    num_ones();

if(num_ones(and(n1->feature, n2->feature)) ==
                num_ones(n1->feature))
        h = 0.0;
    else
        h = relative_hamming_distance(n1, n2);

return(h);
}
include <stdio.h>
include <ctype.h> int
get_index(c)

char c;

{
    if(isdigit(c))
        return((int)(c - '0'));
    else if(isupper(c))
        return((int)(c - 'A') + 10);
    else if(islower(c))
        return((int)(c - 'a') + 36);
    else
    {
        fprintf(stderr, "Bad character: aborting!");
        exit();
    }
}
```

```
/*
Author:  Arun Rao
         1/9/EP/35722
         Eastman Kodak Company
         Rochester, NY 14653-5722

History:
         Started ..... October 1, 1991.

Description:

Given a bitmap (assumed 255 on 0), returns a binary corner-based
         feature vector.
*/ include <stdio.h> include "config.h"
include "structures.h"

define REGION_THRESHOLD 1 char *
get_packed_binary_features(data, width, height,
          threshold, nf, nel, display_tty)

unsigned char  *data;    /* Bitmap -- INPUT */
int            width, height; /* Bitmap dimensions -- INPUT */
double         threshold; /* Potential threshold for corner finder -- INPUT */
int            *nf; /* Number of corners found -- RETURN */
int            *nel; /* Number of elements in feature vector -- RETURN */
char           *display_tty; /* Device for feature display -- NULL for none */

{
         Point          *point_list, *get_point_list();
         Neighbor       *neighbor, *setup_delta_v();
         double         *potential, *compute_potentials();
         Vector         *electric_field, *gradient();
         int            n_neighbor, n_regions;
         Threshold_Datatdata;
         Region         region_list[MAX_REGIONS];
         int            belongs_to_corner();
         void           build_contiguous_regions();
         char           *fv, *get_packed_binary_fv();
         int            n_points;
         double         mean_pot;
         int            t, i, j;
```

```c
/* Get point list from bitmap */
point_list = get_point_list(data, width, height, &n_points);

/* Set up the potential increments for each point in neighborhood */
neighbor =
        setup_delta_v(NEIGHBORHOOD, CONSTANT, &n_neighbor);

/* Compute potentials at each point */
potential = compute_potentials(neighbor, n_neighbor, point_list,
          n_points, data, width, height, &mean_pot);

for(i = 0; i < width; i++)
{
    for(j = 0; j < width; j++)
        printf("%lf ", potential[i*width + j]);
    printf("0);
} t = (int)(21.7 * mean_pot - 7.0);

/*printf("Approximate line thickness: %d0, t);*/

/* Compute gradient of potential -- electric field */ electric_field = gradient(potential, width, height);

/* Fill members of array required by the membership function --
   belongs_to_corner */
tdata.array = potential;
tdata.threshold = threshold;
tdata.field = electric_field;
tdata.bitmap = data;
tdata.w = width;
tdata.h = height;

/* Make a list of regions based upon the specified membership
   function */
build_contiguous_regions(potential, width, height,
        belongs_to_corner, &tdata, region_list,
        &n_regions);

/*if(display_tty != NULL)
      display_regions(region_list, n_regions,
              width, height, display_tty);       */

*nf = n_regions;
```

```
/*printf("# regions: %d0, n_regions);*/
/*if(n_regions < REGION_THRESHOLD)
    return(0);*/

/* Get the binary feature vector corresponding to the bitmap */
fv = get_packed_binary_fv(region_list, n_regions, electric_field,
            width, height, nel);

/* Free memory */
while(!free(point_list));
while(!free(neighbor));
while(!free(potential));
while(!free(electric_field));

/* Return the feature vector */
return(fv);
}
include <stdio.h>
include "config.h"
include "structures.h"

#define LN_OF_HALF 0.69314718
#define XBINS 3
#define YBINS 3
define THETA_BINS 1 char *
get_packed_binary_fv(regn, n_regn, field, w, h, nel)

Region   *regn;
int    n_regn;
int    w, h;
Vector    *field;
int    *nel;       /* Number of elements in feature vector */

{
    static char*fv = NULL;
    unsigned int    shift_left;
    int        n, xnew, ynew, theta_new, theta, x, y,
            i;

/* Calling program is responsible for freeing memory */
    fv = (char *)calloc((*nel = XBINS * YBINS * THETA_BINS) + 1,
            sizeof(char));

for(i = 0; i < *nel; i++)
        fv[i] = '0';
```

```
for(n = 0; n < n_regn; n++)
{
        get_region_info(regn[n], w, field, &theta, &x, &y);

if(theta < 0)
                theta = 360 + theta;
        /* Determine scaled x, y and theta coordinates */
        xnew = (int)(((double)x/(double)w) * XBINS);
        ynew = (int)(((double)y/(double)h) * YBINS);
        theta_new = (int)(((double)theta/360.0) * THETA_BINS);
        shift_left = (ynew * XBINS + xnew) +
                        theta_new * XBINS * YBINS;
        fv[shift_left] = '1';
} return(fv);
}
/* This function computes the gradient of a specified potential field */ include "config.h"
include "structures.h"

Vector
*gradient(a, w, h)

double   a[];
int   w, h;

{ int   x, y, k, nn, row_offset;
        Vector   *field;

field = (Vector *)calloc((nn = w*h), sizeof(Vector));

row_offset = w;
        for(y = 1; y < h - 1; y++)
        {
                for(x = 1; x < w - 1; x++)
                {
                        k = row_offset + x;
                        field[k].x = (a[k - 1] - a[k + 1])/2.0;
                        field[k].y = (-a[k - w] + a[k + w])/2.0;
                }
                row_offset += w;
        }
```

```
        for(x = 1; x < w - 1; x++)
        {
                k = (h - 1)*w + x;
                field[k].x =  (a[k - 1] - a[k + 1])/2.0;
                field[k].y =  -a[k - w]/2.0;   /* Assume zero potential
                                                  outside grid */ field[x].x =  (a[x - 1] - a[x + 1])/2.0;
                field[x].y = a[x + w]/2.0;
        } for(y = 1; y < h - 1; y++)
        {
                k = (y + 1)*w - 1;
                field[k].x = a[k - 1]/2.0;
                field[k].y =  (- a[k - w] + a[k + w])/2.0;
                k = y*w;
                field[k].x = -a[k + 1]/2.0;
                field[k].y =  (- a[k - w] + a[k + w])/2.0;

} field[nn - 1].x =  a[nn - 2]/2.0;
        field[nn - 1].y =  -a[nn - w - 1]/2.0;

field[nn - w].x = -a[nn - w + 1]/2.0;
        field[nn - w].y = -a[nn - 2*w]/2.0;

field[0].x = -a[1]/2.0;
        field[0].y = a[w]/2.0;

field[w - 1].x = a[w - 2]/2.0;
        field[w - 1].y = a[2*w - 1]/2.0;

return(field);
} include <stdio.h>
include <string.h> define LABEL_MAXLEN 62 include "binstruct.h"
```

```
void
hc_packed_bin_load(cat_array, nel)

Category   **cat_array;
int        *nel;

{
    FILE    *fp;
    char    buffer[LABEL_MAXLEN];
    char    labels[1000][LABEL_MAXLEN];
    int     n_occur[1000], i;
    char    features[1000][100];
    char    line_buf[100];
    int     fv_el;
    fp = fopen("bincode.log", "r");

fscanf(fp, "%d0, &fv_el);

i = 0;
    while(fgets(line_buf, 100, fp))
    {
        sscanf(line_buf, "%s %d %s", labels[i],
               &n_occur[i], features[i]);
        i++;
    }

*nel = i;
    *cat_array = (Category *)calloc(*nel, sizeof(Category));
    for(i = 0; i < *nel; i++)
    {
        strcpy((*cat_array)[i].label_string, labels[i]);
        (*cat_array)[i].n_occur = n_occur[i];
        (*cat_array)[i].feature = strdup(features[i]);
    } fclose(fp);
}

/*
Author:  Arun Rao
         1/9/EP/35722
         Eastman Kodak Company
         Rochester, NY 14653-5722

History:
         Started ..... October 31, 1991
```

Description:

Modeled after lsearch(3), performs a metric
search on a specified table with a specified tolerance.
Returns a null-terminated list of pointers to sufficiently close data.
The metric to be used is specified by the user, and is
assumed to return a double.
*/ include <stdio.h>

/*
****************** Example code **********************

```c
typedef struct {
        int    index;
        char   letter;
        } DB;

main(argc, argv)

int     argc;
char    *argv[];

{
        static int   index[] = {0, 2, 34, 1, 23, 75, 89, 19};
        static char *label = "ABCDEFGH";
        DB           db[100], key, **list, **ptr;
        double       int_compare();
        void         copy();
        int          i, nel;
        char         **msearch(), **mfind();

nel = 8;
        for(i = 0; i < nel; i++)
        {
                db[i].index = index[i];
                db[i].letter = label[i];
        } key.index = 1;
        while(key.index >= 0)
        {
                printf("Enter key:0);
                scanf("%d %c", &(key.index), &(key.letter));
                list = (DB **)msearch((char *)&key, (char *)db, &nel,
                        sizeof(key), int_compare, copy, 3.0);
```

```
    if(list = (DB **)mfind((char *)&key, (char *)db, &nel,
        sizeof(key), int_compare, 3.0))
{
        ptr = list;
        printf("List of matches:0);
        while(*ptr)
        {
          printf("%d %c0, (*ptr)->index, (*ptr)->letter);
          ptr++;
        }
}
else
                printf("Not found !!0);
        }
} double
int_compare(n1, n2)

DB   *n1, *n2;

{
        double    tmp;

tmp = abs(n1->index - n2->index);
        return(tmp);
} void
copy(n1, n2)

DB   *n1, *n2;

{
        n1->index = n2->index;
        n1->letter = n2->letter;
}
******************** End of example code ************************
*/ char **
msearch(key, base, nelp, width, metric, copy, tol)

char       *key;
char       *base;
unsigned int    *nelp;
unsigned int    width;
double          (*metric)();
```

```
void       (*copy)();
double     tol;

{
    int  i;
    char **list, *ptr, **list_ptr;
    int  found;

/* Calling routine must free the list */
    list = (char **)calloc(*nelp + 2, sizeof(char *));
    ptr = base;
    list_ptr = list;
    found = 0;
    for(i = 0; i < *nelp; i++)
    {
        if(metric(key, ptr) <= tol)
        {
            found = 1;
            *(list_ptr++) = ptr;
        }
        ptr = ptr + width;
    } if(!found)
    {
        copy(ptr, key);
        *(list_ptr++) = key;
        (*nelp)++;
    }

*list_ptr = NULL;
    return(list);
} char **
mfind(key, base, nelp, width, metric, tol)

char          *key;
char          *base;
unsigned int  *nelp;
unsigned int  width;
double        (*metric)();
double        tol;

{
    int  i;
    char **list, *ptr, **list_ptr;
```

```
        int     found;

/* Calling routine must free the list */
list = (char **)calloc(*nelp, sizeof(char *));

ptr = base;
list_ptr = list;
found = 0;
for(i = 0; i < *nelp; i++)
{
        if(metric(key, ptr) <= tol)
        {
            found = 1;
            *(list_ptr++) = ptr;
        }
        ptr = ptr + width;
} if(found)
    {
        *list_ptr = NULL;
        return(list);
    }
    else
    {
        return(NULL);
    }
}
include <stdio.h>
include <string.h>

/*main(argc, argv)
int     argc;
char    *argv[];

{
    unsigned int    dum1, dum2;
    double          h;
    char            *xor(), *tmp, *and();

puts((tmp = and(argv[1], argv[2])));

h = (double)num_ones(tmp)/(double)num_ones(argv[1]);

printf("%lf0, h);
}
```

```
*/ int
num_ones(feature)

char    *feature;

{
    int         count, i;

count = 0;
    for(i = 0; i < strlen(feature); i++)
    {
        if(feature[i] == '1')
            count++;
    }
    return(count);
} char
*xor(s1, s2)

char *s1, *s2;

{
    char *s3;
    int  i;

if(strlen(s1) != strlen(s2))
    {
        fprintf(stderr, "** Unable to compute XOR ... aborting ! **0);
        exit();
    } s3 = strdup(s1);

for(i = 0; i < strlen(s1); i++)
        if(s1[i] != s2[i])
            s3[i] = '1';
        else
            s3[i] = '0';

return(s3);
} char
```

```
*and(s1, s2)

char *s1, *s2;

{
    char *s3;
    int  i;
    if(strlen(s1) != strlen(s2))
    {
        fprintf(stderr, "** Unable to compute AND ... aborting ! **0);
        exit();
    } s3 = strdup(s1);

for(i = 0; i < strlen(s1); i++)
        if((s1[i] == '1') && (s2[i] == '1'))
            s3[i] = '1';
        else
            s3[i] = '0';

return(s3);
}
/*
```

Author:   Arun Rao
          1/9/EP/35722
          Eastman Kodak Company
          Rochester, NY 14653-5722

History:
        Started ..... October 1, 1991.

Description:

Computes potentials across bitmap field.

*/ include <stdio.h>
include "config.h"
include "structures.h"

double *
compute_potentials(neighbor, n_neighbor, point_list, n_points, data, w, h,
            mean_pot)

```
Neighbor     *neighbor;
int          n_neighbor;
Point        *point_list;
int          n_points;
int          w, h;
unsigned char *data;
double       *mean_pot;

{
    int    k, n, x, y;
    double *potential;

if((potential = (double *)calloc(w*h, sizeof(double))) == NULL)
    {
        perror("Potential in compute_pot.c");
        exit();
    }

*mean_pot = 0.0;
    for(k = 0; k < n_points; k++)
    {
        /* All points in neighborhood */
        for(n = 0; n < n_neighbor; n++)
        {
            x = point_list[k].x + (int)neighbor[n].x_off;
            y = point_list[k].y + (int)neighbor[n].y_off;
            if(/*(data[y*w + x] == 255) &&*/ (x < w) && (x >= 0)
                && (y < h) && (y >= 0))
                potential[y*w + x] +=
                    neighbor[n].delta_v;
        }
        (*mean_pot) +=
            potential[w*(point_list[k].y) + point_list[k].x];
    }
    (*mean_pot) = (*mean_pot)/n_points;

return(potential);
}
/*
```

Author:   Arun Rao
    1/9/EP/35722
    Eastman Kodak Company
    Rochester, NY 14653-5722

History:
    Started ..... October 1, 1991

Description:

Given a bitmap, returns a point list.
*/ include "config.h"
include "structures.h"

Point *
get_point_list(data, w, h, np)

unsigned char  *data; /* Bitmap */
int        w, h; /* Dimension of bitmap */
int        *np;  /* Number of points -- RETURN */

{
    Point*point_list;
    int   i, j, k, n;

point_list = (Point *)calloc(w*h, sizeof(Point));

*np = 0;
    n = 0;
    for(i = 0; i < h; i++)
    {
        for(j = 0; j < w; j++)
        {
            if(data[n++] == 255)
            {
                point_list[(*np)].x = j;
                point_list[(*np)].y = i;
                (*np)++;
            }
        }
    } return(point_list);
}
include <math.h>
include "config.h"
include "structures.h"

define RAD_2_DEG (180.0/3.1415927)

void
get_region_info(region, width, field, theta, x, y)

```c
Region      region;
int     width;
int     *theta, *x, *y;
Vector      *field;

{
    double          x_sum, y_sum;
    int         i;
    register int    index;

x_sum = y_sum = *x = *y = 0.0;
    for(i = 0; i < region.n_points; i++)
    {
        index = (region.point_list)[i];

(*x) += index%width;  /* Mean position */
        (*y) += index/width;    /* of corner */ x_sum +=
            field[index].x;
        y_sum +=
            field[index].y;
    }

*x = (*x)/region.n_points;
    *y = (*y)/region.n_points;

*theta = (int)(RAD_2_DEG * atan2(y_sum, x_sum));
}
/*
```

Author:   Arun Rao
          1/9/EP/35722
          Eastman Kodak Company
          Rochester, NY 14653-5722

History:
        Started ..... October 1, 1991

Description:

Computes a neighbor list given a neighborhood value.

```c
*/
include <math.h> include "config.h"
include "structures.h"
```

```
Neighbor *
setup_delta_v(neighborhood, c, n_neighbor)

int    neighborhood;  /* INPUT -- how far away should the voltages be affected ? */
double c;             /* INPUT -- Maximum voltage that can be added */
int    *n_neighbor;   /* RETURN -- Number of neighbors */

{ int       i, j, n;
    Neighbor  *neighbor;
    double    distance;

n = sqr((2*neighborhood + 1));
    neighbor = (Neighbor *)calloc(n, sizeof(Neighbor));

(*n_neighbor) = 0;
    for(i = - neighborhood; i <= neighborhood; i++)
         for(j = - neighborhood; j <= neighborhood; j++)
         {
              if(i | j)
              {
                   neighbor[(*n_neighbor)].x_off = (double)j;
                   neighbor[(*n_neighbor)].y_off = (double)i;
                   distance = hypot((double)j, (double)i);
                   neighbor[(*n_neighbor)].delta_v
                        = c/distance;
                   (*n_neighbor)++;
              }
         } return(neighbor);
}
```

I claim:

1. A character recognition system that identifies an input character as being a unique member of a defined character set, said system comprising:

a bit-map means for generating a character bit-map of an input character;

a character recognition means for processing said character bit-map and generating a set of (M) finite confidence measures one for each of (M) members of said character set, said confidence measures representing the degree of confidence that said input character corresponds to each of said (M) members of said character set;

a decision means for deciding if the confidence measure with the highest degree of confidence is an acceptable confidence measure;

a first output means for reporting as an output character the member of said character set with said acceptable confidence measure;

an augment means for identifying (N) of said (M) members with the (N) highest confidence measures, where (M) is greater than (N), and processing said bit-map if said decision means decides that there is no acceptable confidence measure, said augment means having a measuring means for measuring stroke endpoint locations and orientations of said bit-map and a second output means for reporting one of said (N) members as an output character based on said stroke endpoint locations and orientations; and wherein said augment means further comprises a database means having a database of character strings, each said character string including a subset of said character set and wherein the members of each said subset represent different characters in said character set which have common stroke endpoint locations and orientations.

2. The system of claim 1 wherein said database means comprises unique database signatures each associated with one of said character strings; said measuring means comprising means for generating a search signature related to said location and orientation of said stroke endpoints; and said augment means comprising search means for searching, in response to said search signature, said database signatures to identify an output character string and for locating matches between said output string and said (N) members with the (N) highest confidence measures.

3. The system of claim 2 wherein said second output means comprises means for reporting one of said (N) members as an output character according to the following rule:
if there is a match for only one of said (N) members and said output character string, report the matching member as the output character;
if there is a match for more than one of said (N) members and said output character string, report the matching member with the highest confidence measure as the output character; and
if there are no matches for said (N) members and said output character string, report the member with the highest confidence measure as the output character.

4. The system of claim 3 wherein (N) is equal to two.

5. The system of claim 3 wherein said measuring means further comprises charge model means for constructing a potential profile based on a charge distribution model of said bit-map and location means for thresholding said potential profile and clustering said thresholded profile to determine said locations of said stroke endpoints.

6. The system of claim 5 wherein said measuring means further comprises gradient means for obtaining a gradient of said potential profile to determine said orientations of said stroke endpoints.

7. A stroke endpoint detector that identifies which of (N) candidate characters represents a unique member of a defined character set comprising:
a bit-map means for reading an input bit-map;
a database means having a database of character strings, each said character string comprises a subset of said character set and wherein the members of each said subset representing different characters in said character set which have common stroke endpoint features;
measuring means for measuring the location and orientation of said stroke endpoints of said character bit-map, said measuring means including charge model means for constructing a potential profile based on a charge distribution model of said bit-map and location means for thresholding said potential profile and clustering said thresholded profile to determine the locations of regions of said stroke endpoints in said bit-map;
search means, responsive to said measuring means, for searching said database to identify an output character string, and locate matches between said output string and said (N) candidate characters; and
output means responsive to said search means for reporting a matching candidate character as an output character.

8. The detector of claim 7 wherein said database means comprises unique database signatures each associated with one of said character strings; said measuring means comprises means for generating a search signature related to said location and orientation of said stroke endpoints; and said search means comprises means for searching, in response to said search signature, said database signatures to identify said output character string and for locating matches between said output string and said (N) candidate characters.

9. The detector of claim 8 wherein said (N) candidate characters each have a weighting factor associated therewith; and said output means comprising means for reporting one of said (N) candidate characters as an output character according to the following rule:
if there is a match for only one of said (N) candidate characters and said output character string, report the matching candidate character as the output character;
if there is a match for more than one of said (N) candidate characters and said output character string, report the matching candidate character with the highest weighting factor as the output character; and
if there are no matches for said (N) candidate characters and said output character string, report the candidate character with the highest weighting factor as the output character.

10. The detector of claim 9 wherein (N) is equal to two.

11. The detector of claim 10 wherein said measuring means further comprises gradient means for obtaining a gradient of said potential profile to determine the orientations of said stroke endpoints.

12. A character recognition method for identifying an input character as being a unique member of a defined character set comprising the steps of:
generating a character bit-map of an input character;
processing said character bit-map with a character recognition procedure to generate a set of (M) finite confidence measures one for each of (M) members of said character set, said confidence measures representing the degree of confidence that said input character corresponds to each of said (M) members of said character set;
determining if the confidence measure with the highest degree of confidence is an acceptable confidence measure;
if there is an acceptable confidence measure, reporting as an output character the member of said character set with said acceptable confidence measure;
if there is no acceptable confidence measure, identifying (N) of said (M) members with the (N) highest confidence measures, where (M) is greater than (N), and analyzing said character bit-map to measure stroke endpoint locations and orientations of said bit-map;
reporting one of said (N) members as an output character based on the measure of said stroke endpoint locations and orientations; and
further comprising the step of: constructing a database of character strings, each said character string comprising a subset of said character set and wherein the members of said subset represent different characters in said character set which have common stroke endpoint locations and orientations; and wherein said analyzing step comprises the step of searching said database.

13. The method of claim 12 further comprising the steps of:
constructing said database with unique signatures each associated with one of said character strings;

generating a search signature in said analyzing step to determine the location and orientation of said stroke endpoints; and using said search signature in said searching step for searching said database signatures to identify an output character string, and locating matches between said output string and said (N) members with the (N) highest confidence measures.

14. The method of claim 13 further comprising the step of reporting one of said (N) members as an output character according to the following rule:

if there is a match for only one of said (N) members and said output character string, report the matching member as the output character;

if there is a match for more than one of said (N) members and said output character string, report the matching member with the highest confidence measure as the output character; and if there are no matches for said (N) members and said output character string, report the member with the highest confidence measure as the output character.

15. The method of claim 14 wherein (N) is equal to two.

16. The method of claim 14 wherein said analyzing step further comprises the steps of:

constructing a potential profile based on a charge distribution model of said bit-map;

thresholding said potential profile to form a thresholded profile; and clustering said thresholded profile to determine the locations of regions of said stroke-endpoints in said bit-map.

17. The method of claim 16 wherein said analyzing step further comprises the step of obtaining a gradient of said potential profile to determine the orientations of said stroke endpoints.

18. A stroke endpoint detection method that identifies which of (N) candidate characters represents a unique member of a defined character set comprising:

reading an input bit-map;

constructing a learned database of character strings, each said character string comprising a subset of said character set and wherein the members of each said subset representing different characters in said character set which have common stroke endpoint locations and orientations;

measuring stroke-endpoint location and orientation of said character bit-map by using a charge model means for constructing a potential profile based on a charge distribution model of said bit-map and thresholding said potential profile and clustering said thresholded profile to determine the locations of regions of said stroke endpoints in said bit-map;

searching said database to identify an output character string, and locate matches between said output string and said (N) candidate characters; and reporting one of said matches as an output character.

19. The method of claim 18 further comprising the steps of:

constructing said learned database with unique signatures each associated with one of said character strings;

generating a search signature in said analyzing step to determine the location and orientation of said stroke endpoints; and using said search signature in said searching step for searching said database signatures.

20. The method of claim 19 wherein said (N) candidate characters each have a weighting factor associated therewith; and wherein said reporting step comprises the step of reporting one of said (N) candidate characters as an output character according to the following rule:

if there is a match for only one of said (N) candidate characters and said output character string, report the matching character as the output character;

if there is a match for more than one of said (N) candidate characters and said output character string, report the matching member with the highest weighting factor as the output character; and if there are no matches for said (N) candidate characters and said output character string, report the candidate character with the highest weighting factor as the output character.

21. The method of claim 20 wherein (N) is equal to two.

22. The method of claim 21 wherein said measuring step further comprises the step of obtaining a gradient of said potential profile to determine the orientations of said stroke endpoints.

* * * * *